(No Model.)
H. C. SERGEANT.
ROCK DRILL.
No. 326,682. Patented Sept. 22, 1885.
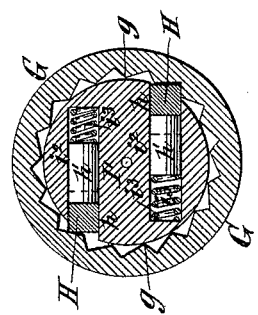
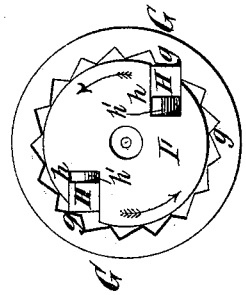
Witnesses.
Emil Herter
Matthew Pollock.
Inventor:
Henry C. Sergeant
by his Attys
Brown & Hall

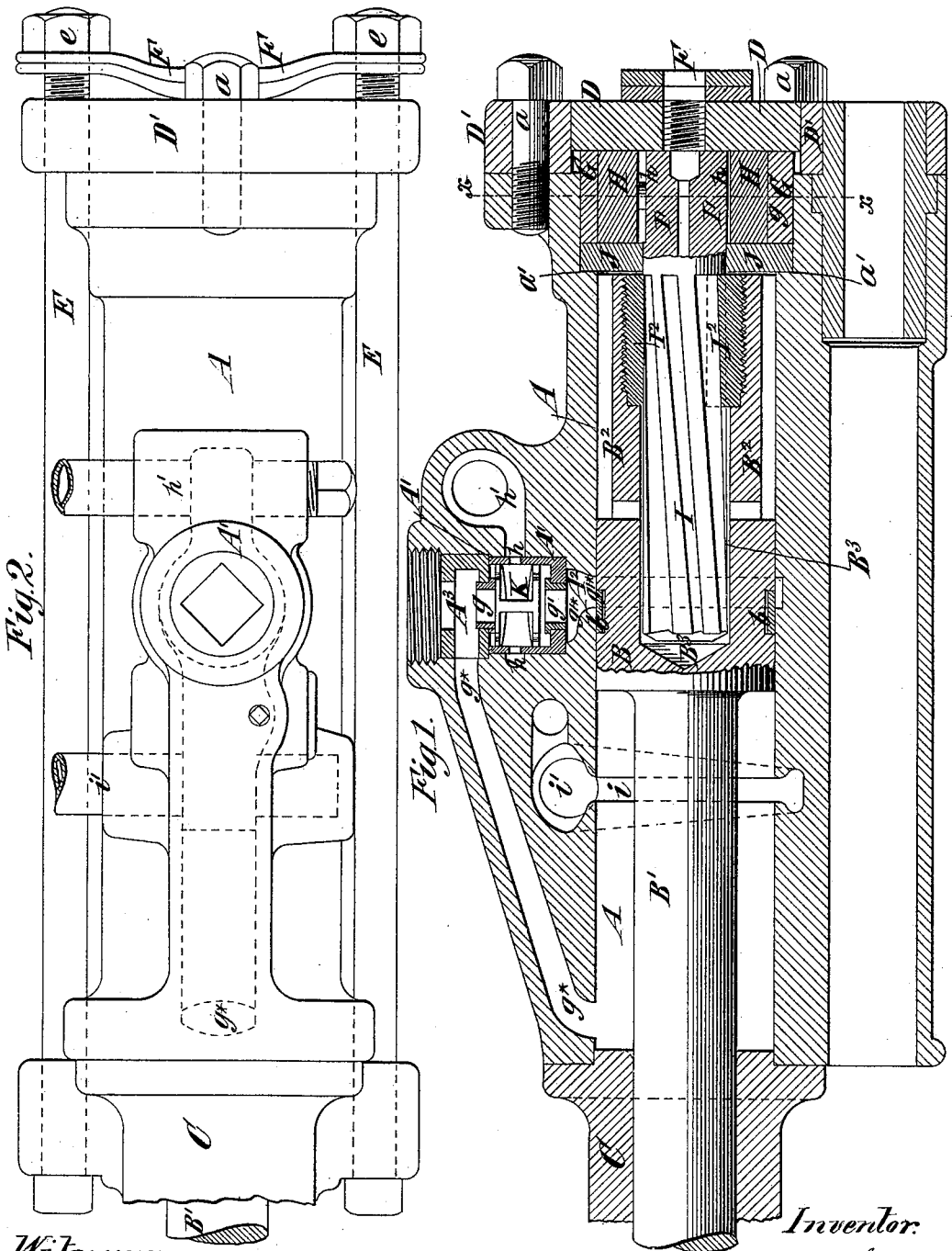

UNITED STATES PATENT OFFICE.

HENRY C. SERGEANT, NEW YORK, N. Y.

ROCK-DRILL.

SPECIFICATION forming part of Letters Patent No. 326,682, dated September 22, 1885.

Application filed June 15, 1885. (No model.)

*To all whom it may concern:*

Be it known that I, HENRY C. SERGEANT, of the city and county of New York, in the State of New York, have invented a new and useful Improvement in Rock-Drills, of which the following is a specification.

My invention relates to devices which are employed for rotating the piston and bit of a rock-drill. Mechanism for this purpose commonly comprises a ratchet and pawls, one, either the ratchet or pawls, being held in the cylinder while the other, either the pawls or ratchet, can turn in one direction only.

In my applications for Letters Patent No. 145,343, filed October 13, 1884, and No. 157,445, filed March 2, 1885, I have shown and described rotating devices which consist of two rings having ratchet-shaped teeth upon their adjacent faces. One of these rings is clamped and held by friction within the cylinder, and the other is locked to a spirally-grooved piston-extension, or to the head of a spirally-grooved bar, so as to turn therewith; but one of these rings may be considered as the ratchet and the other as the pawl or pawls operating in connection with the ratchet. One advantage of this class of rotating devices is that while the ratchet, which is clamped and held by friction in the cylinder, is so firmly held that it will not turn and will be practically fixed in the ordinary operation of the drill, it will turn in case of the bit becoming stuck, or in case any great resistance is otherwise opposed to the turning of the piston, and by so turning it will prevent breakage of parts. I have now discovered that the same principle of operation may be utilized in a somewhat different construction of rotating devices.

According to my present invention, one member of the rotating devices consists of a sleeve which is, as heretofore, clamped and held by friction in the cylinder, and the other member of the rotating devices is so connected with the piston that it cannot turn independently thereof. The last said member of the rotating devices may consist of a cylindric head formed upon a central spiral bar, which is fixed in the top of the cylinder and fits a nut in the piston; or the last said member of the rotating devices may consist of a nut which is fitted to a spirally-grooved piston-extension working through it. In either construction the member of the rotating devices which is locked to the piston is contained within and made to turn in a sleeve which is clamped in a cylinder. One of the two members, either the sleeve or the part rotating within it, is provided with ratchet-shaped teeth extending lengthwise of the cylinder, while the other said member is provided with pawls engaging with these teeth.

The invention consists in novel combinations of parts, which are hereinafter described, and pointed out in the claims.

In the accompanying drawings, Figure 1 represents a longitudinal section of portions of a drill which are necessary to illustrate my invention. Fig. 2 represents a plan of those parts of the machine. Fig. 3 represents an end view of the rotating devices, looking from the right hand of Fig. 1, the said devices being removed from the cylinder; and Fig. 4 is a sectional view upon the plane of the dotted line $x\ x$, Fig. 1, of the rotating devices alone.

Similar letters of reference designate corresponding parts in all the figures.

A designates the cylinder of the rock-drill. B designates the piston, which is fitted to work therein, and B' designates the piston-rod, working through the lower end of the cylinder. The piston B may be provided with suitable packing-rings, $b$, and has an upwardly or rearwardly projecting piston-extension, $B^2$. The cylinder has a valve-chest, A', wherein is arranged a valve-casing composed of two parts, $A^2\ A^3$, to which is fitted a valve, K, which consists of a cylindric skeleton structure adapted to close alternately upon the seats $g\ g'$. The valve chest has an annular belt, $h$, to which motive fluid is admitted by the pipe or passage $h'$, and from the two seats $g\ g'$ ports or passages $g^*\ g'^*$ lead to the cylinder above and below the piston. Between the ports or passages $g^*\ g'^*$ the piston has an annular exhaust-port, $i$, having an outlet, $i'$, to which the exhaust-pipe is to be connected. The valve K, by closing alternately upon the seats $g\ g'$, controls the admission of motive fluid alternately through the passages $g^*\ g'^*$ to the cylinder on opposite sides of the piston, and as the construction and operation of the valve K is fully described in my application for Letters Patent, Serial No. 145,343, filed October 13, 1884, no further description thereof is here necessary, as these features form no part of my present invention. To the upper end of the cylinder A is secured a ring or head-piece, D', which has an annular bore or central opening, and is secured to the cylinder by bolts a. Within this piece D' is fitted a head, D, which consists simply of a cylindric disk or piece of metal held in place by a spring, F, acting upon its outer side, and through which pass the bolts E, whereby the lower head of the cylinder C is secured in place, as will be best understood from Fig. 2. In the cylinder near its upper end is formed a shoulder or counterbore, a', and in this counterbore and bearing against the shoulder is placed a ring, J. Arranged centrally within the cylinder and projecting inward thereinto is a spirally-grooved bar, I, which is received in the cavity $B^3$ within the piston and piston-extension, and which is fitted to a nut, $I^2$, screwed fast or otherwise secured in the piston-extension. This spiral bar I fits snugly within the ring J, and is supported and free to turn therein. At its upper end the spiral bar I is provided with a head, I', which is of cylindric form externally, and constitutes one member of the rotating devices, and encircling this head I' is a sleeve or ring, G, which is made of considerable length, as shown in Fig. 1, and which is of the same diameter as the ring J, so as to fit snugly within the counterbore a' of the cylinder and against said ring J. The upper head D bears against the outer edge or side of the sleeve or ring G, and hence it will be seen that this sleeve is clamped and held in place by the pressure of the spring F between the ring J and the upper head, D, and the clamping force with which the sleeve G is held in place may be varied by tightening the nuts e upon the bolts E. In this example of my invention the sleeve or ring G constitutes one member of the rotating devices, which is clamped and held by friction in the cylinder, and the head I' of the spirally-grooved bar I constitutes the other member of the rotating devices, which is by the bar I and the nut $I^2$ locked to the piston, so that it cannot turn independently thereof. One member of the rotating devices—in this example of the invention the sleeve G—is provided with ratchet-shaped teeth g, as shown most clearly in Figs. 3 and 4, and the other member of the rotating devices—in this instance the head I'—is provided with pawls H, which engage with the ratchet-teeth g, as also best shown in Figs. 3 and 4. In this example of the invention the pawls H consist of rectangular plugs or pieces of metal which are let into tangential sockets or seats h in the head I', and have inwardly-projecting stems or studs h', which enter sockets or holes $i^2$, drilled in the bottom of the seats h, as best shown in Fig. 4. Within the sockets or holes $i^2$ are springs $i^3$, which bear against the ends of the studs or stems h', and tend to force the pawls H outward into engagement with the ratchet-shaped teeth g upon the sleeve G, as best shown in Fig. 4. When the piston makes its downward or working stroke, the nut $I^2$, acting upon the spiral bar I, tends to turn the bar and its head I' in the direction of the arrow shown in Fig. 3, and this it can do readily, the springs $i^3$ permitting the pawls H to yield so as to ride over the teeth g. When the piston makes its upward or return stroke, the nut $I^2$, acting upon the bar I, tends to turn it and its head in the opposite direction to that indicated by the arrow in Fig. 3. This it cannot do, however, because of the pawls H bearing against the faces of the teeth g, which are parallel with the sides of the rectangular seats or slideways h, wherein the pawls H are fitted, and as the bar I and head I' cannot turn in that direction, the piston and its nut $I^2$ will be compelled to turn upon the spiral bar I. In case, however, of any unusual resistance to the turning of the piston, caused by the bit striking a flaw in the rock or otherwise, the pawls H, acting upon the teeth of the sleeve G, will overcome the frictional resistance to its turning, and said sleeve will be turned in the cylinder and breakage of parts prevented.

It will be seen from the above description that the sleeve G and the pawls H may be made as long as desired in a direction lengthwise of the cylinder, and hence these pawls will have a very strong engagement with the teeth g.

I do not desire to be restricted to the use of sliding pawls, such as are herein shown, but may use pivoted pawls, such as are in common use in rock-drills. I consider, however, that the sliding pawls are very desirable because of their great strength, and because of the ample guidance and strong support which they are afforded in the seats or slideways h.

I have here represented the two pawls H as stepped relatively to each other half the length of one of the teeth g, as shown clearly in Figs. 3 and 4. By this means I secure a very gradual rotation or a rotation by very short steps, and I leave the teeth g long and strong, so that there is no danger of their becoming inoperative by a little wear.

It is obvious that the sleeve G might be arranged in a recess or counterbore in the head D and be clamped by the head against the end of the cylinder; but the sleeve would be still clamped by friction within the cylinder, as the head may be considered a part of the cylinder.

What I claim as my invention, and desire to secure by Letters Patent, is—

1. The combination, with the cylinder and piston of a rock-drill, of rotating devices comprising two members, one of which consists of a sleeve or ring held by friction within the cylinder and the other of which is locked to turn with the piston and arranged within the sleeve or ring, one member being provided with ratchet-shaped teeth and the other with pawls engaging therewith, substantially as herein described.

2. The combination, with the cylinder and piston of a rock-drill, of a sleeve or ring clamped by friction within the cylinder, constituting one member of the rotating devices, and provided upon its interior surface with ratchet-shaped teeth extending lengthwise of the cylinder, of a head or piece constituting the other member of the rotating devices arranged within the sleeve and locked to the piston, and pawls carried by the last-mentioned member of the rotating devices and engaging with the ratchet-teeth of said sleeve, substantially as herein described.

3. The combination, with the cylinder and piston of a rock-drill, of a spirally-grooved bar fitting a nut in the piston and having upon it a head, a sleeve encircling the head and clamped and held by friction within the cylinder, the sleeve and head constituting the two members of the rotating devices, and one being provided with ratchet-shaped teeth extending lengthwise of the cylinder, and the other carrying pawls engaging with said teeth, substantially as herein described.

4. The combination, with the cylinder and piston of a rock-drill, of a spirally-grooved bar fitting a nut in the piston and having a cylindric head carrying pawls, and a sleeve encircling said head clamped and held by friction in the cylinder, and provided upon its interior surface with ratchet-shaped teeth with which the pawls of the head engage, substantially as herein described.

5. The combination, with the cylinder and piston of a rock-drill, of rotating devices consisting of the sleeve or member G, clamped and held by friction within the cylinder and provided upon its interior surface with ratchet-shaped teeth $g$, and the member I', locked to the piston and provided with tangential slideways $h$, and sliding spring-actuated pawls H, fitting said slideways and engaging with the teeth of the sleeve or member G, substantially as herein described.

6. The combination, with the cylinder and piston of a rock-drill, of the sleeve G, clamped and held by friction within the cylinder and provided with ratchet-shaped teeth $g$, the spiral bar I, fitting a nut in the piston and having a head, I', in which are tangential slideways or pawl-seats $h$, and spring-actuated sliding pawls H, fitting said seats or slideways, substantially as herein described.

7. The combination, with the cylinder and piston of a rock-drill, of the sleeve G, provided with teeth $g$ upon its inner surface and clamped and held by friction within the cylinder, the member I', constructed with tangential slideways or seats $h$ and with sockets or holes $i^2$, extending inward therefrom, and the sliding pawls H, provided with inwardly-projecting stems or studs $h'$, and springs $i^3$, arranged in the sockets or holes $i^2$ and acting upon said pawls, substantially as herein described.

HENRY C. SERGEANT.

Witnesses:
C. HALL,
FREDK. HAYNES.